(12) United States Patent
Reed et al.

(10) Patent No.: US 8,461,973 B2
(45) Date of Patent: Jun. 11, 2013

(54) INTEGRATED VEHICLE CELLULAR TELEPHONE DETECTION SYSTEM

(75) Inventors: John F. Reed, St. Marys, PA (US); Joe C Largey, Kersey, PA (US); Amy B. Reed, St. Marys, PA (US)

(73) Assignee: Orion Innovations, North East, PA (US)

( * ) Notice: Subject to any disclaimer, the term of this patent is extended or adjusted under 35 U.S.C. 154(b) by 439 days.

(21) Appl. No.: 12/897,769

(22) Filed: Oct. 4, 2010

(65) Prior Publication Data

US 2011/0080274 A1    Apr. 7, 2011

Related U.S. Application Data

(60) Provisional application No. 61/278,173, filed on Oct. 2, 2009, provisional application No. 61/337,045, filed on Jan. 28, 2010, provisional application No. 61/337,746, filed on Feb. 10, 2010, provisional application No. 61/307,581, filed on Feb. 24, 2010, provisional application No. 61/311,531, filed on Mar. 8, 2010.

(51) Int. Cl.
*B60Q 1/00*   (2006.01)
*H04M 1/66*   (2006.01)
*H04M 11/04*  (2006.01)

(52) U.S. Cl.
USPC ............... 340/425.5; 340/539.1; 455/407; 455/405; 455/410; 455/414.1; 455/418; 455/575.9; 455/569.2; 455/556.1; 455/456.4; 455/404.1

(58) Field of Classification Search
USPC ....................... 340/425.5; 455/405
See application file for complete search history.

(56) References Cited

U.S. PATENT DOCUMENTS

| | | | |
|---|---|---|---|
| 6,675,006 B1 | 1/2004 | Diaz et al. | 455/404.1 |
| 6,687,497 B1 | 2/2004 | Parvulescu et al. | 455/420 |
| 6,771,946 B1 | 8/2004 | Oyaski | 455/345 |
| 6,907,252 B2 | 6/2005 | Papadias et al. | 455/456.1 |
| 6,965,787 B2 | 11/2005 | Kindo et al. | 455/569.2 |
| 7,474,264 B2 | 1/2009 | Bolduc et al. | 342/463 |
| 2001/0050614 A1 | 12/2001 | Yang | 340/540 |
| 2004/0198306 A1* | 10/2004 | Singh et al. | 455/345 |
| 2006/0142917 A1* | 6/2006 | Goudy | 701/45 |
| 2006/0212195 A1 | 9/2006 | Veith et al. | 701/35 |
| 2007/0173293 A1 | 7/2007 | Tran | 455/569.1 |
| 2008/0036623 A1 | 2/2008 | Rosen | 340/936 |
| 2008/0064446 A1 | 3/2008 | Camp et al. | 455/565 |
| 2008/0268768 A1* | 10/2008 | Brown et al. | 455/1 |
| 2009/0029675 A1 | 1/2009 | Steinmetz et al. | 455/410 |
| 2009/0063201 A1 | 3/2009 | Nowotarski et al. | 705/4 |
| 2009/0085728 A1 | 4/2009 | Catten et al. | 340/439 |
| 2010/0035632 A1 | 2/2010 | Catten | 455/456.1 |
| 2010/0227601 A1 | 9/2010 | Walton et al. | 455/418 |

OTHER PUBLICATIONS

Press Release, "CellAntenna Introduces Cell Phone Detection System to Prevent Passenger Train and Public Transportation Accidents," May 26, 2010, 2 pages.

(Continued)

*Primary Examiner* — Donnie Crosland
(74) *Attorney, Agent, or Firm* — Robert M. Bauer

(57) ABSTRACT

There is provided a structure and a method to detect a signal prompted by the use of a wireless communications device in a motor vehicle or, optionally, in the area of a vehicle operator station. A signal detection will set off audible and/or visual alarms. The alarms may continue until the signal is no longer detected.

30 Claims, 3 Drawing Sheets

OTHER PUBLICATIONS

Cellbusters Cellphone Detector Plus User Manual, Feb. 2009, 10 pages.
Key2SafeDriving.com, May 12, 2010, 19 pages.
Zoomsafer.com, Aug. 24, 2010, 3 pages.
Aegis Mobility—DriveAssist & Teen Driving, May 5, 2009, 2 pages.

International Search Report and Written Opinion dated Jan. 11, 2011; International Application No. PCT/US2010/051377; 11 pages.
Preliminary Report on Patentability dated Apr. 12, 2012; International Application No. PCT/US2010/051377; 10 pages.

* cited by examiner

INTEGRATED VEHICLE CELLULAR TELEPHONE DETECTION SYSTEM

This application claims the priority benefit of the filing date of the following provisional patent applications: 1) U.S. Provisional Patent Application No. 61/278,173 filed on Oct. 2, 2009; 2) U.S. Provisional Patent Application No. 61/337,045 filed on Jan. 28, 2010; 3) U.S. Provisional Patent Application No. 61/337,746 filed on Feb. 10, 2010; 4) U.S. Provisional Patent Application No. 61/307,581 filed on Feb. 24, 2010; and 5) U.S. Provisional Patent Application No. 61/311,531 filed on Mar. 8, 2010, each of which provisional patent applications is hereby incorporated by reference.

FIELD OF THE INVENTION

The present invention relates to motor vehicle safety. More particularly, the invention relates to a system which detects the use of a wireless communication device, such as a cellular telephone (sometimes referred to as a "cellphone"), by a person while driving a motor vehicle.

BACKGROUND

As there has been a rapid growth in the use and operation of wireless communication devices, such as cellular telephones, there is a growing understanding of the impacts of these devices on our everyday life. The ability to communicate with others has been enhanced tremendously, in no small part, due to the convenience of these devices.

But there have also been some negative consequences resulting from this new convenience. In particular, there has been growing awareness and concern over the impact of cell phone use by drivers while driving vehicles. A growing number of states have passed laws prohibiting cell phone use while driving, and additional states are considering similar regulation of cell phone use. However, regulation alone cannot control the use of cell phones by drivers while driving.

A number of technological approaches have been taken to address this problem. However, all of these known approaches have at least one disadvantage. For example, some approaches require a subscription or require that the cell phone to be detected is pre-programmed. These cellphone-centric solutions only work with a cellphone that has been subscribed or pre-programmed. Such systems can be defeated by swapping the subscribed or pre-programmed cellphone with another cellphone that is not subscribed or pre-programmed. The system will also not work for any new driver of the vehicle unless the new driver's cellphone is also subscribed or pre-programmed. See U.S. Patent Application Publication No. 2010/0227601 filed by Randy Walton et al on Mar. 9, 2009, and U.S. Patent Application Publication No. 2009/0029675 filed by Allan Steinmetz et al on Jul. 23, 2008, for examples of previous approaches.

BRIEF SUMMARY OF THE PREFERRED EMBODIMENTS

A cell phone detection device that is engineered to detect radio waves in the frequency range of cellular telephones is installed into a common passenger motor vehicle, such as a sedan, SUV, pickup truck, or van. The placement of the detection device and the detection range of the detection device are manipulated and programmed respectively to limit the detection of the radio frequency range of cellular telephones, as required for reception and transmission to the area in the immediate proximity of the vehicle driver station. The placement of the detection device and the detection range of the detection device are also manipulated and programmed to allow the unaffected utilization of radio waves in the frequency range of cellular telephones, as required for transmission and reception at the non-driver passenger stations of the vehicle. As the detection device detects signals in the radio frequency range of cellular telephones, as required for reception and transmission of voice signals, when the vehicle transmission lever is placed in any drive operations position, this action causes transmission of an electrical current by the detection device that is directed to the circuitry that transmits this current to an audio recording device, prompting a verbal audio announcement that is transmitted to and heard over a vehicle-installed speaker. Transmission of this same current by the detection device also causes the vehicle audio entertainment system to shut down and causes exterior lights of the vehicle to continually flash on and off until such time as the detection device no longer detects radio frequency in the range required for cellular telephone transmission and/or reception.

For vehicles equipped with a hands-free cellular telephone assistance device, the vehicle operator-cellular telephone user has the option of placing the cellular telephone in a cellular telephone holding boot that is located outside of the programmed range of the detection device. Placement of the cellular telephone to be utilized by the vehicle operator into the holding boot allows for operation of the holding boot-installed cellular telephone by the vehicle operator without the effects of detection of radio frequency range of the cellular telephone, as required for receipt and transmission by the detection device. Removal of the vehicle operator-utilized cellular telephone from the holding boot and/or detection of transmission or reception signal within the programmed range of the detection device will cause interruption of the function of the hand-free cellular telephone assistance device.

It is an object of the present invention to provide a cell phone detection device to detect radio waves in the frequency range of cellular telephones emanating from a cell phone inside a motor vehicle.

It is another object of the present invention to provide a cell phone detection device to detect radio waves in the frequency range of cellular telephones emanating from a cell phone within the driver station area of a motor vehicle.

It is another object of the present invention to provide a cell phone detection device to detect radio waves in the frequency range of cellular telephones emanating from a cell phone within the driver station area of a motor vehicle and, when a signal is detected, a verbal audio announcement is made, the audio entertainment system is shut down, and the exterior lights of the vehicle flash as long as the signals are detected.

It is a further object of the present invention to provide a cell phone detection device to detect radio waves in the frequency range of cellular telephones emanating from a cell phone within the non-driver passenger area of a motor vehicle.

It is a further object of the present invention to provide a cellular telephone holding boot that is located outside the programmed range of the detection device to allow hands-free cell phone use by the vehicle driver.

It is a further object of the present invention to provide a cell phone detection device that incorporates all of the above objects of this invention and is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DETAILED DESCRIPTION OF THE PREFERRED EMBODIMENTS

Figure 1:
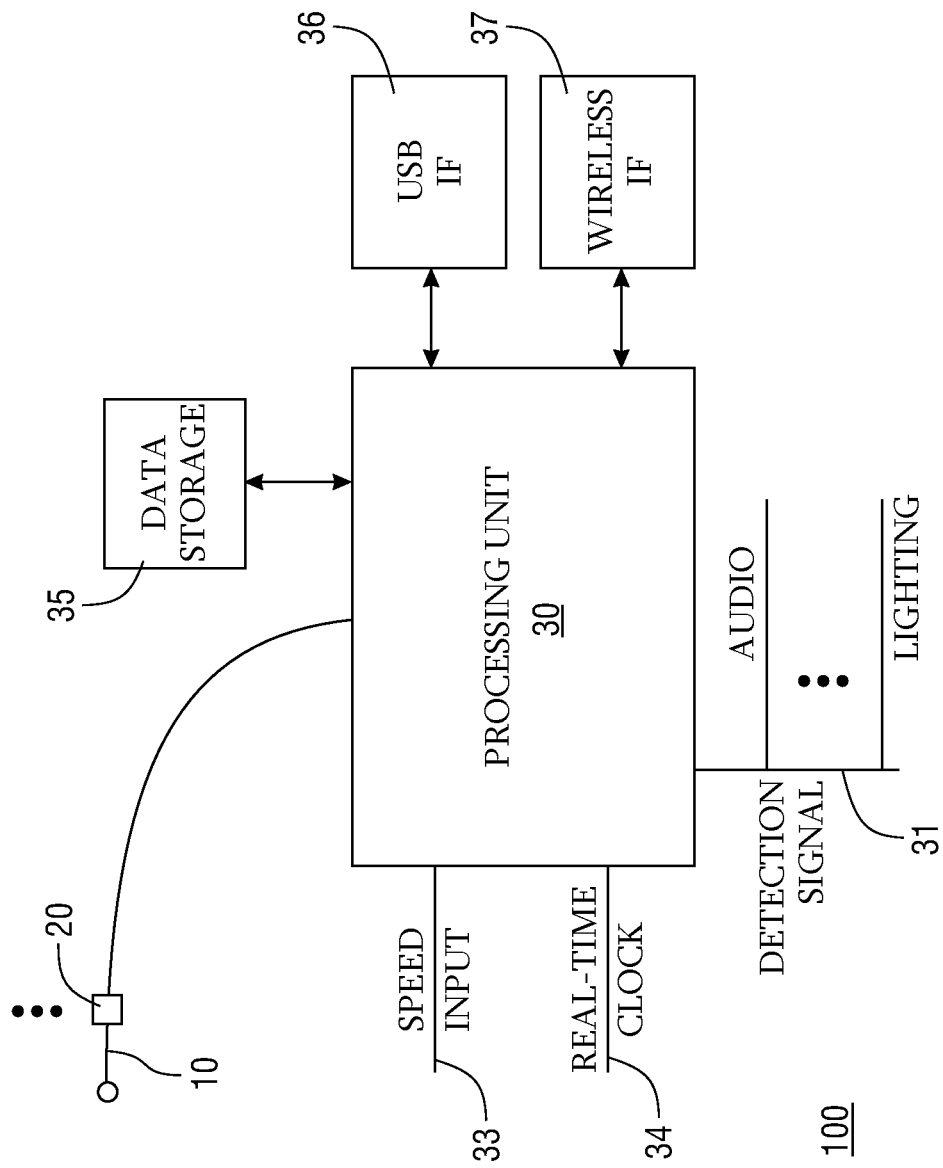
FIG. 1 is a block diagram showing the architecture of the integrated vehicle cellular telephone detection system according to a preferred embodiment of the invention.

Preferred embodiments of the invention are now described with particular reference to the drawings. An integrated vehicle detection system according to the preferred embodiments combines a radio frequency signal detection device and processing unit with the electrical functions of the motor vehicle to discourage operation of a cellular telephone within the confines of a motor vehicle interior during operation of the vehicle. With adjustments as described herein, the preferred embodiments may be employed regardless of whether the vehicle is a sedan, SUV, pickup truck, van, cargo hauling vehicle such as a tractor-trailer combination as commonly used for over-the-road cargo transport, fleet delivery van or truck, taxi cab, or multiple passenger transport vehicle such as a bus, train, aircraft, or boat.

Preferably, the radio frequency signal detection device has a range which is limited to the position for an operator driving the vehicle so that passengers in the vehicle can utilize their cellphones without triggering the system. The cellular telephone signal detection system may be integrated as a built-in electronic feature of the vehicle when manufactured, or it may be installed as an "after market" option added after manufacture. Some of the preferred embodiments include an advanced cellular telephone signal detection device, but a conventional cellular telephone signal detection device may also be adapted for use in some embodiments.

The preferred embodiments can be used to deter use of a variety of wireless communication devices. In addition to cellphones, such devices include, for example, laptops, mobile computing devices, GPS devices, electronic mapping and navigation devices, and a variety of other connected electronic devices. Since the preferred embodiments are based on detection of the radio frequency signal, the particulars of the device are largely irrelevant and a particular vehicle detection system need only be concerned with the type of wireless communication interface that the device utilizes.

Cellphones are of particular concern because they are relatively ubiquitous and simple to use. Many cellphones allow phone calls to be made or answered by a simple step such as opening the phone or pressing a key, and people utilize the cellphone even while driving an automobile. In this application, the term "cellphone" (or cellular telephone) is meant to refer to any device that uses any one of a variety of standardized radio interfaces which is now or is hereafter known to support telephony functionality between the device and a network while the device is moving at a high rate of speed such as when in a moving vehicle. Such radio interfaces include not only Global System for Mobile Communication ("GSM") and Code Division Multiple Access ("CDMA2000"), but also more modern radio interfaces like Worldwide Interoperability for Microwave Access Mobile ("WiMax") even though it may not utilize cells in the strictest sense of the word. Other network radio interfaces such as WiFi may be developed or expanded in the future so as to facilitate their use in vehicles or there may be routers provided in vehicles which receive a cellular signal and provide a WiFi connection in the vicinity of the vehicle. Although specific cellular embodiments are described herein, the invention is not limited to such cellular embodiments and may be applied to a variety of instances involving a network radio interface of some kind.

The preferred cellular embodiments of the invention take advantage of the fact that, despite there being many models of cellphones, all cellphones must use a known standardized radio interface to operate. Furthermore, the frequencies on which the cellphone must operate are also standardized in most countries. Thus, the preferred embodiments detect the use of a cellphone in a vehicle by appropriately monitoring the requisite frequencies to detect signals that are in accordance with the radio interface. Most radio interfaces for cellphones are separated into a control channel, a downlink channel for voice and data received by the cellphone, and an uplink channel for voice and date transmitted by the cellphone. When a cellphone is operating in an idle mode in which it is available to receive phone calls, signals are only present on the control channel and there are no signals on the downlink or uplink channels. Most notifications are also provided to the cellphone on the control channel rather than a downlink channel. Thus, some preferred embodiments monitor only the uplink channels and only deter actual use of the cellphone rather than mere ringing of the cellphone or receipt of notifications. In this way, a person can leave their cellphone on while driving the vehicle so as to be aware of any phone calls or notifications, and can pull over the vehicle to use their cellphone in safety.

As shown in the block diagram of FIG. 1, the detection system 100 comprises at least one antenna 10 detecting radio frequency signals and providing an electrical signal representative of the signal strength, energy level, and/or other characteristics of the detected radio frequency signals. Suitable locations for the antenna include, but are not limited to, the vehicle steering wheel, the vehicle sun visor located at the driver's station of the vehicle, or in the roof directly above the driver or above the driver's visor. Two or three antennas can be used to increase the sensitivity of the detection system to the location of the wireless communication device, such as when it is desired to have a detection range that is approximately the same as the driver's position in the vehicle. In such a case, the antennas are preferably separated from each other but still located in the vicinity of the driver position. For example, additional antennas can be placed in the dashboard in front of the driver or under the driver's seat. The placement of the antennas is selected to optimize the sensitivity of the system to detect use of a cellular telephone or other wireless communication device specifically at and around the driver station area of the vehicle. The detection range of the system is adjusted and/or programmed respectively to limit the detection of the radio frequency range of cellular telephones to the area in the immediate proximity of the vehicle operator position. This allows the unaffected utilization of a cellular telephone or other wireless communication device at the non-driver passenger stations of the vehicle without detection. An illustration of an exemplary detection range and the unaffected passenger areas in a typical motor vehicle is illustrated in the provisional applications, such as in FIG. 2 of U.S.

Provisional Patent Application No. 61/311,531 filed on Mar. 8, 2010, which is herein incorporated by reference. The cell phone detection system thus detects radio frequency range of cellular telephones as required for reception and transmission and/or supply of electrical power to a cellular telephone device, or change in the level and/or amount of power supply to a cellular telephone device or other electronic device within the driver station area of a motor vehicle.

For vehicles equipped with a hands-free cellular telephone assistance device, the cellular telephone may be placed at a position that is outside of the programmed range of the detection system so as to allow for undisturbed operation of the cellular telephone. Removal of the cellular telephone from a location that is outside of the programmed range of the detection system into the programmed range of the detection system will cause interruption of the function of the hand-free cellular telephone assistance device and will further cause transmission of signal by the detection device which prompts audio and/or visual warnings and/or transmission of this same current to be directed to and/or directed by and/or harnessed by and/or programmed to be received by and/or be programmed by and/or be manipulated by one or several of a variety of electronic devices for a purpose or purposes that include, but are not limited to processing of data and/or recording of data and/or prompting an additional audio and/or visual alarm or alarms and/or prompting compromise of a function or functions of the vehicle in which the transmission of the signal does occur and/or prompting compromise of a function or functions of the cellular telephone device that initiated transmission of this same current. The preferred embodiments thus may provide unaffected operation of a cellular telephone that is located outside the programmed range of the detection device in such a manner that allows optional hands-free cell phone use by the vehicle driver.

Each antenna is attached to a respective amplifier circuit 20, which receives and amplifies the electrical signal provided by the respective antenna 10 in a specified frequency range. It is an important aspect of the preferred embodiments that each amplifier circuit 20 be directly attached to or integrated with, rather than merely connected to, its respective antenna 10 so as to ensure that its output signal is highly sensitive and accurate. The processing unit 30 is normally located in the dashboard, under the driver's seat, or at some other unobtrusive location and the inventors have found that the unamplified signals of the antenna are quite sensitive to the length and positioning of the connector and makes it difficult to accurately set the detection range of the system to be substantially the same as the driver's position in the vehicle and to exclude passengers in the vehicle. If a discrete amplifier circuit 20 is attached to the antenna 10, it must be quite small in size (i.e., less than one inch square) so that it is unobtrusive when placed at the same location as the antenna. Suitable amplifier circuits are available from Mini-Circuits, Inc. of Brooklyn, N.Y.

Each amplifier circuit 20 does some pre-processing of the signal received from its respective antenna 10 and provides an output signal having voltage range that is proportional to the signal strength of the detected radio frequency signal. For example, the amplifier output voltage may have a first voltage when no radio frequency signal is detected and a second voltage when a full radio frequency signal is detected. The output signal may be analog or digital. This output signal of the amplifier circuit 20 does not in and of itself indicate whether a wireless communication device is in use.

The output signal of each amplifier circuit 20 is provided to a processing unit 30 by a connector 25. The processing circuit 30 receives the output signal from each amplifier circuit 20 and determines whether a wireless communication device is in use. The determination is based on both the level of the signal strength of the detected radio frequency signal as represented by the voltage of the output signal of the amplifier circuit 20 and the application of a timing analysis to determine if the detected radio frequency signal corresponds to that of the known radio interface.

The first part of determining whether a wireless communication device is in use consists of determining whether the detected radio frequency signal in the uplink channel originated from a detection zone within the vehicle. In this regard, the voltage of the output signal from each amplifier circuit 20 is compared to a reference voltage to see if the detected radio frequency signal is of sufficient strength. The reference voltage has a value carefully selected and adjusted in consideration of the range of voltages in the output signal of the amplifier circuit(s) 20 and the characteristics of the vehicle. A comparison is made between the reference voltage and the output signal of the amplifier circuit 20. For example, if the output signal of the amplifier circuit 20 has a voltage of 2.2 volts when there is no signal detected and a voltage of 1.0 volts when there is a full signal detected, then the reference voltage can be set to 1.5 volts. (Of course, rather than the negative slope in this example, the output signal can also have a positive slope where the voltage increases as the signal strength increases.) When the output signal of the amplifier circuit 20 in the example is less than 1.5 volts, the output of the comparison shows that the signal is of sufficient strength to be transmitted from a device in the vehicle.

Of course, the details of the comparison may be different from the above example, and the reference voltage will vary depending on a number of factors such as the location of the antenna and the characteristics of the vehicle. It is comparatively easy to select a reference voltage so that the signals transmitted by a wireless communication device inside the vehicle can be distinguished from signals transmitted by a wireless communication device outside the vehicle. However, it is preferred to be able to further distinguish between a device used by an operator driving the vehicle and a device used by a passenger in the vehicle. For this reason, the system allows the use of multiple antennas to triangulate the location of the device based on the voltages of the output signals reference from the respective processing circuits 20. But to enable a detection system using only a single antenna, the processing unit 30 preferably enables the reference value to be varied based on the characteristics of the vehicle. Adjustment of the reference value, in effect, adjusts the range of the system.

The reference value used by the processing circuit 30 can be varied and adjusted in a number of different ways. Most simply, there is a sensitivity setting on processing unit 30 which allows the reference value to be manually adjusted. For new vehicle manufacture, the characteristics of the vehicle and the location of the antenna placement in the vehicle are known in advance, and the adjustment can be made in advance. In such cases, the reference value may be fixed or varied only with appropriate safeguards to prevent disabling of the system rather than being manually adjustable. For aftermarket installations of the system, since the amplifier circuit 20 is with the antenna 10, the system works regardless of the location of the processing unit 30 or the length or bending of the connector between the amplifier circuit 20 and the processing unit 30. Thus, the reference value and the detection zone can preferably be manually adjusted after the antenna 10 is located in its final position but before the processing circuit 30 is installed in its final position in the dashboard or under the seat or is otherwise not easily accessed. In other cases, the adjustment can be made occurs easily after the antenna is located. Since the signal strength of a cellphone at the time of installation varies depending upon the status of its battery and its distance from the nearest cellular base station, after-market installation should not depend on a cellphone chosen at random to perform the adjustment. For this reason, an installation tool may be provided with the system that emits a wireless signal of fixed strength in accordance with a known cellphone radio interface, but which does not actually communicate with a cellular base station or otherwise operate as a cellphone. The installation tool can be operated alternately in both the desired detection zone in the driver position for operating the vehicle and in a passenger position in order to adjust the reference value for optimization of the desired detection zone.

The second part of determining whether a wireless communication device is in use consists of subjecting the aforementioned comparison result to a time based analysis. This analysis includes checking the timing of the detected radio frequency signal to ensure that it is consistent with that of a known radio interface. Although imperceptible to the user, a cellphone is not constantly transmitting when it is in use. Rather, it must adhere to a specific timing pattern of the radio interface. Since the radio interface is standardized, the timing pattern is known and the comparison result is checked for consistency with the timing pattern.

Because the alarm or other warning that occurs when use is detected while driving should be highly undesirable in order to effectively dissuade the activity, it is all the more important to reduce false positives. In addition to checking the timing of the signal, the processing unit 30 may implement any number and variety of quality techniques to ensure that the determination that the wireless communication device is in use inside the vehicle or, optionally, the desired detection zone in the driver position for operating the vehicle. For example, it may be required that the comparison and the timing analysis have results positively indicating wireless communication device use over an extended period of time (e.g., 15 seconds) before the processing unit 30 makes a final determination that the vehicle operator is using a wireless communication device while driving.

When processing unit 30 makes a final determination that a wireless communication device is being used by the vehicle operator while driving, it may provide a warning alert or recorded audio message via a speaker in the unit. However, it is preferable for the action taken upon detection to be more substantial so that it serves as an effective deterrent. Processing unit 30 thus outputs a simple binary detection signal 31 which indicates the final determination of whether the vehicle operator is using a wireless communication device while driving.

This detection signal 31 may be connected to any number and variety of systems in the vehicle. As shown in FIG. 1, the detection signal may be connected to a lighting circuit and used to trigger a series of lights in the interior of the vehicle, such as light emitting diode (LED) lights, or to trigger flashing of exterior lights in such a manner so as to bring attention to the cellphone use. The detection signal may also be used to trigger an audio circuit so as to disrupt the vehicle stereo system and use it for a loud audible message, alert tone or warning. One particular consideration is to gradually increase the audio to such a significant volume that the operator driving the vehicle finds it difficult or awkward to continue their phone call on the cellphone due to the difficulty of hearing the conversation. This is the converse of many cellphone detection systems employed in hospitals, theaters, libraries, etc., where the intent is to reduce noise and interruptions. The audio and lighting circuits are just two examples, and the detection signal 31 can also be used to trigger different circuits providing different warnings or actions. The detection signal 31 can be directed to and/or directed by and/or harnessed by and/or programmed to be received by and/or be programmed by and/or be manipulated by one or several of a variety of electronic devices in the vehicle for a purpose or purposes that include, but are not limited to processing of data and/or recording of data and/or prompting an audio and/or visual alarm or alarms and/or prompting compromise of a function or functions of the vehicle in which the transmission of the signal does occur and/or prompting compromise of a function or functions of the cellular telephone device that initiated transmission of this same current. Preferably, the circuits repeat the warnings or actions at least until the detection signal 31 changes value, indicating that cellphone use has stopped or that the vehicle is no longer being driven by the person using the cellphone.

In a further feature of the preferred embodiments, the processor unit 30 is connected to a vehicle bus and contains a module or interface 32 for a controller area network on the vehicle bus. This module or interface 32 permits the processor unit to connect to other systems connected to the controller area network so that, when use of a wireless communication device is detected, it can initiate and send one or more control signals to other systems in the vehicle to utilize those systems. These systems may include, for example, an audio system controlling all of the speakers in the vehicle and a lighting system controlling the internal and external lights of the vehicle. In this feature, the module or interface does not merely provide a signal indicating that the vehicle operator is using their cellphone while driving the vehicle and the signal triggers a circuit which completes some predefined action. Instead, the module or interface 32 provides control signals that instruct the other systems connected to the vehicle bus and controller area network. In this way, the operation of the vehicle, or certain systems of the vehicle, may be compromised in a manner as to discourage use of the wireless communication device. There may also be alarm(s) and/or flashing of lights until such time as it is detected that use of the wireless communications device has ceased. Any number and variety of vehicle systems or modules that is connected to the vehicle bus can be utilized. For example, with appropriate audible warnings, the speed of the vehicle can be forced to gradually decrease despite the operator's use of the accelerator pedal in order to compel the operator to drive the vehicle to the side of the road. As extreme examples, there could be an electric shock applied through the driver's seat or the driver's seat may be ejected from the vehicle.

Optionally, processing unit 30 may receive the output signal of the vehicle's speed sensor indicating the speed of the vehicle via the controller area network. The processing unit may utilize the speed sensor signal 33 as a threshold for triggering action. For example, the processing unit 30 may only detect cellphone use, and change the value of detection signal 31 to indicate that cellphone use has been detected, when the vehicle is moving faster than a minimum speed such as, for example, 10 miles per hour. The processing unit 30 also captures and records the speed indicated by the speed sensor signal 33 when it detects that a person is using their cellphone while driving the vehicle.

The processing unit 30 also receives a real time clock signal 34 providing the time and date and includes data storage 35. The processing unit records the date, time, duration and speed of the vehicle in data storage 35 each time it is detected that the vehicle operator is using their cellphone while driving the vehicle. The processing unit may include a Universal Serial Bus (USB) interface 36 and/or a wireless data interface 37 for intermittently downloading recorded cellphone usage data to a monitoring computer (not shown). The data of such a cellphone usage log may be stored in simple comma delimited format, and the monitoring computer can perform various analysis and reports based on the data. Such a system may be an effective deterrent in circumstances where another party desires to monitor another person's usage of their cellphone while driving the vehicle.

The processing circuit 30 may be implemented in multiple ways by those of ordinary skill in the art. For example, the comparison and timing analysis described herein can be performed on the signal from the amplifier circuit 20 by suitably designed and connected special purpose hardware. Alternatively, a general purpose microcontroller can be adopted for this purpose and appropriately programmed to function in the manner described herein. A suitable microcontroller system having both USB interface 36 and wireless data interface 37 is the CC2531 system-on-chip solution available from Texas Instruments Inc., of Dallas, Tex.

Figure 2:
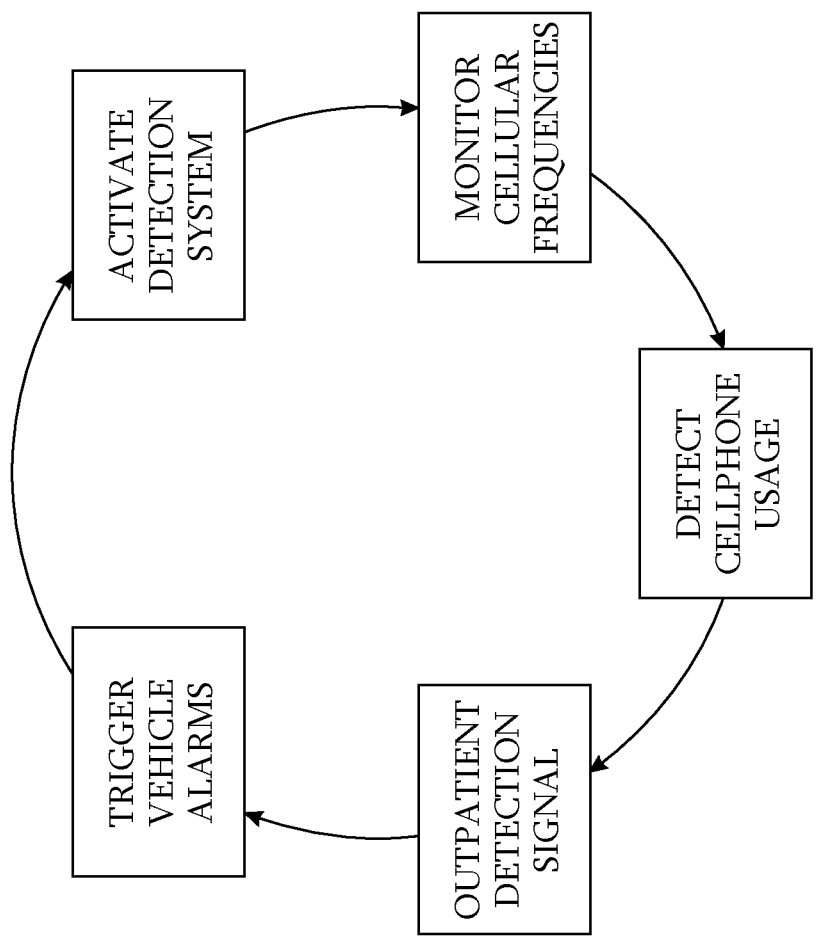
FIG. 2 is a flow diagram of the process performed by the integrated vehicle cellular telephone detection system in FIG. 1.

FIG. 2 is an illustration of the process 200 that may be carried out by the preferred embodiment of the integrated vehicle cellular telephone detection system 100 to detect and dissuade use of a wireless communications device by an operator while driving a vehicle. At 210, the detection system is automatically activated when the vehicle is started, such as by turning on the ignition, and the transmission is moved for "Park". Although not shown, the converse is also true, and the detection system is deactivated when the vehicle is turned off or put back into "Park". At 220, the system passively monitors signals on one or more of the cellular frequencies using at least one antenna 10. During this stage, the detection system 100 may perform any number of functions if there is a cellphone that is active but in the idle mode. For example, it may identify the cellphone from various control signals or information relating to the cellphone, which it then uses to facilitate the process of detecting whether the cellphone is used by an operator while driving the vehicle. The detection system could, for example, use such information to determine with some specificity which uplink or downlink frequency should be monitored for the cellphone rather than scanning a large number of possible uplink or downlink frequencies.

At 230, the processing unit detects that an operator is participating in a telephone call (answering an incoming call or making a call) while driving the vehicle and takes action. Preferably, the detection system does not take action merely because the cellphone rings, unless the operator driving the vehicle also answers the call. This way an operator driving the vehicle who is expecting an important call will know that the call has been made and can move the vehicle to a safe location in order to return the call. However, to prevent even the distraction of the cellphone ringing, the detection system may optionally be configured to detect the receipt of phone calls.

Text messages, picture messages, and push email can also be addressed with the same options described above with respect to phone calls, although typically they have a different notification than the ringing of an incoming voice call. However, many cellphones store text messages, picture messages, and/or emails locally in the cellphone and there may be no activity on the network radio interface if the operator later views it while driving the vehicle. For this reason, it is recommended, but not necessary, that the detection system 100 function to detect such communications according to the known network radio interface specifications for them and take action when such a text message, picture message or email is being received by the operator. In some cases, communications such as the Small Message Service (SMS) in GSM are passed through the control channel rather than a downlink and/or uplink frequency and so the control channel must be monitored to detect them even though the downlink and/or uplink frequency might otherwise be sufficient.

Yet another class of communications is instant messaging (IM), such as AOL Instant Messaging (AIM), Blackberry Messenger (BBM), and Microsoft Social Network (MSN). These communications are especially dangerous because they are specifically intended to provide near instantaneous communications and often include status messages that can be set by the person. For example, a person can indicate whether they are unavailable or bored (and eager to receive messages). A bored status by itself can be indicative that the operator of a vehicle is not acting responsibly and intends to engage in IM while driving. Thus, the detection system should endeavor to detect and take action against IM activity, including the communication of mere status messages. Unfortunately, IM messages are generally not specified in the network radio interface and each IM service operates according to different communication protocols. In general, IM messages are sent in the uplink and downlink data channels so they can be effectively discouraged by detecting and taking action against any and all transfers of data. Therefore, the detection system 100 may not be able to operate with respect to IM messages as effectively as it does with phone calls but it can attempt to do so. If desired despite the additional complexity, the detection system can attempt to block messages associated with a particular IM service by obtaining the communications protocol for the service if possible and utilizing it to detect the IM messages.

At 240, the detection of use of the wireless communications device by the operator while driving the vehicle in 230 leads to the processing unit 30 of detection system 100 generating the detection signal 31 used to trigger action to discourage the use. For example, the detection system can trigger an "annoying" alert tone or prerecorded message. At 250, the detection system 100 takes any and all forms of action, including by communicating with other systems or modules of the vehicle via the vehicle bus and controller area network and instructing them to operate in a certain way. Preferably, a variety of different actions to discourage the cellphone use can be implemented as desired and the detection system 100 enables these actions to be selected according to the preferences of the vehicle owner or the driver. For example, disabling the stereo system may be an effective deterrent for teenage drivers. Conversely, disabling the vehicle by slowly reducing its speed may raise a concern that the driver may not be able to safely drive the car out of traffic to a safe location at which to stop.

At 250, the action taken by the detection system 100 to discourage the use of the wireless communication device continues until either the use ends or the vehicle is turned off. For example, an alert tone can be repeated periodically or lights made to flash. If the use of the wireless communication device ends, the detection system will return to an active state of phase 210 at that time. If the vehicle is turned off, then the detection system 100 will return to the active state phase 210 when the vehicle is restarted.

Figure 3:
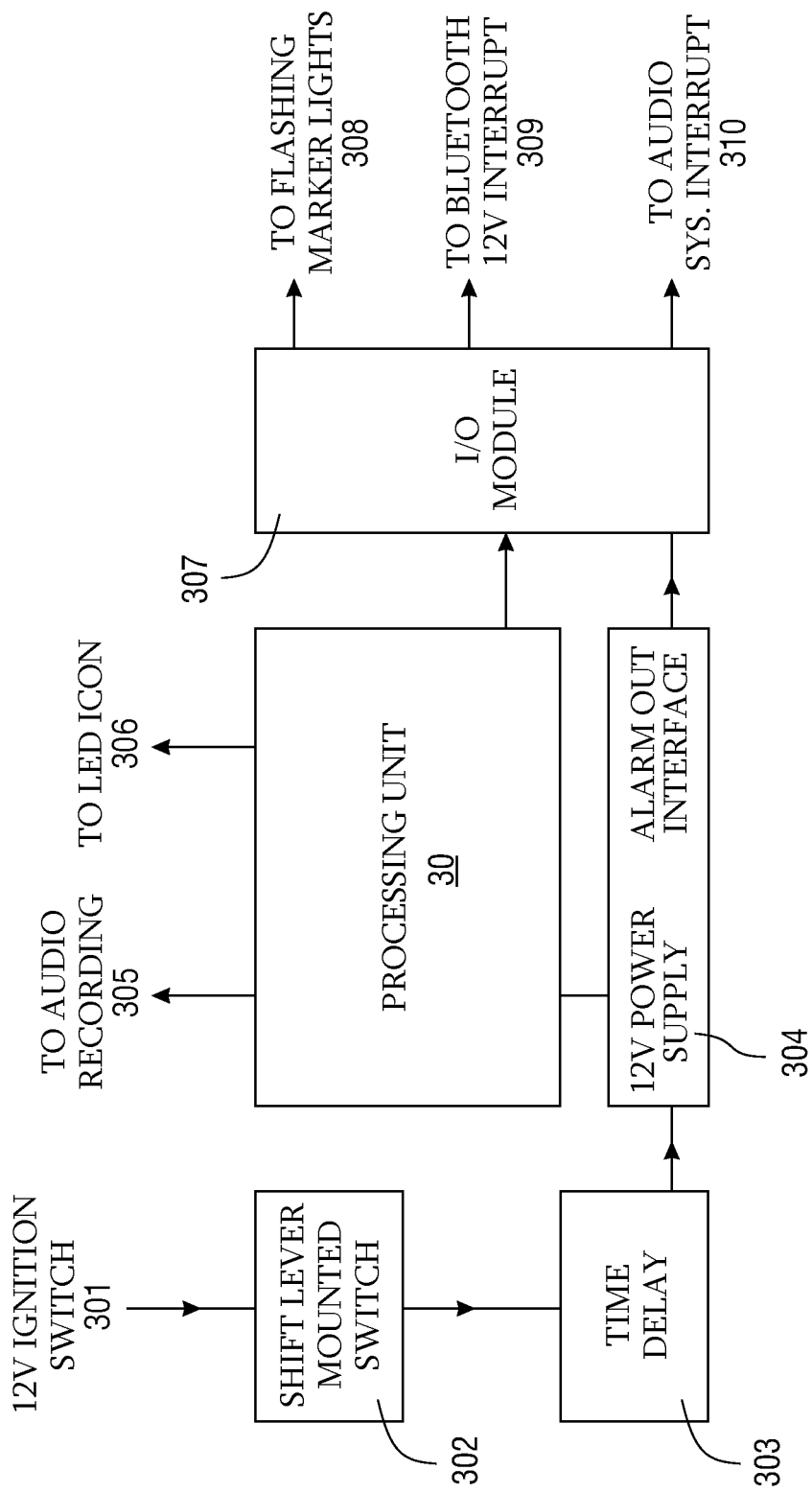
FIG. 3 is a block diagram showing the connections of the processing unit 30 in the integrated vehicle cellular telephone detection system embodiment shown in FIG. 1.

FIG. 3 shows an exemplary installation of the processing unit 30 of the integrated vehicle cellular telephone detection system in a vehicle. The installation includes a 12 volt ignition switch 301, a transmission gear shift switch 302, a time delay 303, and a 12 volt to 6 volt power supply 304. The processing unit 30, when it detects cellphone use by a driver of the vehicle, provides a signal which is connected to an audio circuit to trigger an audio recording 305, and to an LED light circuit to trigger a flashing icon 306. The processing circuit 30 also drives an input/output module 307 that connects to the vehicle bus and can control various systems of the vehicle via the controller area network. For example, I/O module 307 may cause flashing of marker lights 308, interruption of bluetooth communications 309 and interruption of the stereo system 310. There may also be an alarm out interface 311 to the I/O module 307.

The processing unit 30 and other parts of the detection system 100 are preferably automatically activated whenever the vehicle ignition switch 301 is "on" and the vehicle transmission shift switch 302 indicates that the transmission is engaged to permit movement of the vehicle. For instance, when used with an automobile having an automatic or continuously variable transmission, as the vehicle ignition switch is "on" and the vehicle operator places the vehicle transmission in gear (e.g., any position other than the "park" or "P" position), switch 302 integrated with these two vehicle operation functions is activated after time delay 303 so that power supply 304 provides power to processing circuit 30. For vehicles with a manually operated transmission, the signal detection system 100 is automatically activated when the vehicle ignition switch is "on" and the vehicle transmission is placed in gear, that is, any position other than the "neutral" position. The signal detection system is powered off and disengaged when the vehicle ignition switch is "off", or when the vehicle transmission is in a disengaged position, such as the "park" or "neutral" position.

The vehicle cell phone detection system thus detects radio frequency range of cellular telephones as required for reception and transmission and/or supply of electrical power to a cellular telephone device, or change in the level and/or amount of power supply to a cellular telephone device or other electronic device emanating from a cell phone or other wireless communication device inside a motor vehicle.

The vehicle cell phone detection system thus detects radio frequency range of cellular telephones as required for reception and transmission and/or supply of electrical power to a cellular telephone device, or change in the level and/or amount of power supply to a cellular telephone device or other electronic device emanating from a cell phone or other wireless communication device within the driver station area of a motor vehicle, and, when a signal is detected, a verbal audio announcement is made and/or the audio entertainment system is shut down and/or the exterior lights of the vehicle flash as long as the signals are detected and/or transmission of a detection signal is directed to and/or directed by and/or harnessed by and/or programmed to be received by and/or is programmed by and/or is manipulated by one or several of a variety of electronic devices or systems for a purpose or purposes that include, but are not limited to processing of data and/or recording of data and/or prompting an additional audio and/or visual alarm or alarms and/or prompting compromise of a function or functions of the vehicle in which the transmission of the signal does occur and/or prompting compromise of a function or functions of the cellular telephone.

Vehicle cell phone detection systems according to the above preferred embodiments have all of the advantages noted above and is simple in construction, economical to manufacture and simple and efficient to use. They consist of the combination and arrangement of parts hereinafter more fully described, illustrated in the accompanying drawing and more particularly pointed out in the appended claims, it being understood that changes may be made in the form, size, proportions and minor details of construction, placement of and/or total number of antennae as utilized by the detection system, placement of the detection system, and/or inclusion of electronic device or devices as required to facilitate utilization of signals by the detection system as required to be directed to and/or directed by and/or harnessed by and/or programmed to be received by and/or programmed by and/or manipulated by one or several of a variety of electronic devices and systems for a purpose or purposes that include, but are not limited to processing of data and/or recording of data and/or prompting an additional audio and/or visual alarm or alarms and/or prompting compromise of a function or functions of the vehicle in which the transmission of the signal does occur and/or prompting compromise of a function or functions of the cellular telephone, without departing from the spirit or sacrificing any of the advantages of the invention.

An alternative embodiment varies from the above embodiments and integrates a conventional cellular telephone signal jamming device as a dashboard mounted or under the dashboard concealed standard electronic feature. Passengers who desire to operate a cellular telephone device during the mobilized operation of the vehicle, access a remote antenna on the exterior of the vehicle and out of the effective range of the jamming device. This access and connection to the remote antenna is accomplished with an extending/retracting wire from/to a spring activated coil or spooling device that is placed behind the vehicle interior finish paneling or upholstery, and that is accessed for extending the remote antenna connecting wire for attachment to a cellular telephone antennae system by lifting a small surface flush mounted access door, one of which is located in close proximity to each passenger station throughout the vehicle. The remote antenna connecting wire has an attached "plug-in jack" installed at the lead end of the wire that accommodates connection and also has an installed grasping device such as a clip for the purpose of connection to a cellular telephone antennae stem, either of which (jack or clip) effects connection of a cellular telephone antennae system connected at a passenger station by utilization of the extending/retracting connecting wire.

The vehicle operator station extending/retracting connecting wire can be installed with an electrical current interruption device (switch) that disengages completion of connection to the remote antenna as the vehicle transmission shift lever is placed in any position other than that of the "park" or "P" position in vehicles with an automatic or continuously variable operated transmission, or in any position other than that of the "neutral" position for vehicles with a manually operated transmission. As such, remote antenna signal interruption is exclusively effected at the vehicle operator passenger station as the vehicle transmission is engaged in a drive position. When the vehicle ignition switch is the "on" position, reconnection to the remote antenna at the vehicle operator station is effected only as the vehicle transmission lever is placed in the "park" position, or the "neutral" position, as applicable. Sufficient antennae signal for use and operation of a cellular telephone device from the vehicle operator station is eliminated as concurrently, sufficient signal for use and operation of a cellular telephone device from each vehicle non-operator station is simultaneously accommodated.

The foregoing specification sets forth the invention in its preferred, practical forms, but the structure shown is capable of modification within a range of equivalents without departing from the invention, which is to be understood is broadly novel as is commensurate with the appended claims.

We hereby claim the invention as follows:
1. A method of discouraging the use of a wireless communication device by the operator of a motor vehicle, comprising:
detecting radio frequency signals with at least one antenna located in the vicinity of the operator and providing an electrical signal representative of the radio frequency signals detected by said at least one antenna;

amplifying the electrical signal representative of the radio frequency signals detected by said at least one antenna and outputting an amplified signal representative of the radio frequency signals detected by said at least one antenna in a specified frequency range, said specified frequency range being a range of frequencies used by the wireless communication device;

connecting the amplified signal to a processing unit;

processing the amplified signal in the processing unit to detect whether the wireless communication device is in use in the vehicle;

outputting a control signal from the processing unit to a warning unit, said control signal having a value indicative of whether the wireless communication device has been detected; and if the control signal output from the processing unit has a value indicating that a wireless communication device has been detected, then taking action by the warning unit to discourage the operator from using the wireless communication device while driving the motor vehicle.

2. A method according to claim 1, wherein said action taken by the warning unit comprises an audible alarm that is continued until the wireless communication device is no longer in use or the vehicle is no longer being operated.

3. A method according to claim 1, wherein the warning unit comprises at least one system of the motor vehicle having at least one use other than discouraging the operator from using the wireless communication device.

4. A method according to claim 3, wherein the system comprises an audio system of the motor vehicle and the control signal output from the processing unit is input into the audio system.

5. A method according to claim 4, wherein the audio system varies at least the volume of audio in the motor vehicle if the control signal has a value indicating that the wireless communication device has been detected.

6. A method according to claim 5, wherein said wireless communication device includes at least one speaker or earpiece that emits sound, and wherein the volume of audio in the motor vehicle is increased to a high volume if the control signal has a value indicating that a wireless communication device has been detected.

7. A method according to claim 5, wherein the audio in the motor vehicle is muted if the control signal has a value indicating that the wireless communication device has been detected.

8. A method according to claim 4, wherein the audio system emits an audible alarm if the control signal has a value indicating that the wireless communication device has been detected.

9. A method according to claim 3, wherein the system comprises a lighting system of the motor vehicle, the control signal output from the processing unit is input into the lighting system, and the lighting system provides a visual alarm if the control signal has a value indicating that the wireless communication device has been detected.

10. A method according to claim 9, wherein the visual alarm comprises flashing at least one of the external lights of the motor vehicle.

11. A method according to claim 1, further comprising:
receiving a transmission signal in said processing unit, said transmission signal indicating whether or not the motor vehicle is in park or is in gear; and
wherein the control signal has a value indicating that the wireless communication device has been detected only when said transmission signal to said processing unit indicates that the motor vehicle is in gear.

12. A method according to claim 1, further comprising;
receiving a speed signal in said processing unit, wherein said speed signal indicates the speed of the motor vehicle; and
wherein the control signal has a value indicating that the wireless communication device has been detected only when said speed signal input to said processing unit indicates that the speed of the motor vehicle exceeds a minimum specified speed.

13. A system discouraging the use of a wireless communication device by the operator of a motor vehicle, comprising:
at least one antenna detecting radio frequency signals and providing an electrical signal representative of the radio frequency signals detected by said at least one antenna;
an amplifier amplifying the electrical signal representative of the radio frequency signals detected by said at least one antenna and outputting an amplified signal representative of the radio frequency signals detected by said at least one antenna in a specified frequency range, said specified frequency range being a range of frequencies used by the wireless communication device;
a processing unit;
a connector connecting the processing unit to the amplified signal output by said amplifier, the processing unit processing the amplified signal to detect whether the wireless communication device is in use and outputting a control signal having a value indicative of whether the wireless communication device has been detected; and
a warning unit receiving the control signal from the processing unit and, if the control signal has a value indicating that the wireless communication device has been detected, then taking action to discourage the operator from using the wireless communication device while driving the motor vehicle.

14. A system according to claim 13, wherein, if the control signal has a value indicating that the wireless communication device has been detected, the warning unit emits an audible alarm until the wireless communication device is no longer in use or the vehicle is no longer being operated.

15. A system according to claim 13, wherein the processing unit receives a transmission signal, said transmission signal indicating whether or not the motor vehicle is in park or is in gear; and
wherein the control signal has a value indicating that the wireless communication device has been detected only when said transmission signal indicates that the motor vehicle is in gear.

16. A system according to claim 13, wherein the processing unit receives a speed signal, said speed signal indicating the speed of the motor vehicle; and
wherein the control signal has a value indicating that the wireless communication device has been detected only when said speed signal input indicates that the speed of the motor vehicle exceeds a minimum specified speed.

17. A system according to claim 13, wherein when the control signal has a value indicating that use of the wireless communications device has been detected, the processing unit records the date, time, and duration of the use along with the speed of the vehicle in a usage log, and subsequently provides the usage log to a remote computer for downloading and processing.

18. A motor vehicle, comprising:
a position for an operator operating the motor vehicle;
at least one passenger position for a passenger in the motor vehicle;

at least one antenna located in the vicinity of said operator position and separated from said at least one passenger position, said at least one antenna detecting radio frequency signals and providing an electrical signal representative of the radio frequency signals detected by said at least one antenna;

an amplifier amplifying the electrical signal representative of the radio frequency signals detected by said at least one antenna and outputting an amplified signal representative of the radio frequency signals detected by said at least one antenna in a specified frequency range, said specified frequency range being a range of frequencies used by the wireless communication device;

a processing unit;

a connector connecting the processing unit to the amplified signal output by said amplifier, the processing unit processing the amplified signal to detect whether the wireless communications device is in use and outputting a control signal having a value indicative of whether the wireless communications device has been detected; and a warning unit receiving the control signal from the processing unit and, if the control signal has a value indicating that the wireless communications device has been detected, then taking action to discourage the operator from using the wireless communications device while driving the motor vehicle.

19. A motor vehicle according to claim 18, further comprising a transmission, wherein the processing unit receives a transmission signal, said transmission signal indicating whether or not the transmission is in park or is in gear; and wherein the control signal has a value indicating that the wireless communications device has been detected only when said transmission signal indicates that the transmission is in gear.

20. A motor vehicle according to claim 18, further comprising a speed sensor outputting a speed signal indicating the speed of the motor vehicle; and wherein the processing unit receives said speed signal and the control signal has a value indicating that the wireless communication device has been detected only when said speed signal indicates that the speed of the motor vehicle exceeds a minimum specified speed.

21. A motor vehicle according to claim 18, further comprising an audio system receiving the control signal output from the processing unit.

22. A motor vehicle according to claim 21, wherein the audio system varies at least the volume of audio in the motor vehicle if the control signal has a value indicating that the wireless communications device has been detected.

23. A motor vehicle according to claim 22, wherein the volume of audio in the motor vehicle is increased to a high volume if the control signal has a value indicating that the wireless communications device has been detected.

24. A motor vehicle according to claim 22, wherein the audio in the motor vehicle is muted if the control signal has a value indicating that the wireless communications device has been detected.

25. A motor vehicle according to claim 21, wherein, if the control signal has a value indicating that the wireless communications device has been detected, the audio system emits an audible alarm until the wireless communication device is no longer in use or the vehicle is no longer being operated.

26. A motor vehicle according to claim 18, further comprising a lighting system receiving the control signal output from the processing unit, wherein the lighting system provides a visual alarm if the control signal has a value indicating that the wireless communication device has been detected.

27. A motor vehicle according to claim 26, wherein the lighting system comprises internal lights and external lights, and the visual alarm comprises flashing at least one of the external lights until the wireless communication device is no longer in use or the vehicle is no longer being operated.

28. A motor vehicle according to claim 27, wherein said at least one of the external lights that is flashed comprises a light that is a different color than the brakelights of the vehicle.

29. A motor vehicle according to claim 18, wherein the vehicle is disabled and is not enabled until the wireless communication device is no longer in use.

30. A motor vehicle according to claim 18, wherein, when the control signal has a value indicating that use of the wireless communications device has been detected, the processing unit records the date, time, and duration of the use along with the speed of the vehicle in a usage log, and subsequently provides the usage log to a remote computer for downloading and processing.

* * * * *